Aug. 8, 1944.　　　M. P. VUCASSOVICH　　　2,355,405
METHOD AND APPARATUS FOR REMOVING SCALES FROM FISH
Filed Nov. 21, 1939　　　2 Sheets-Sheet 1
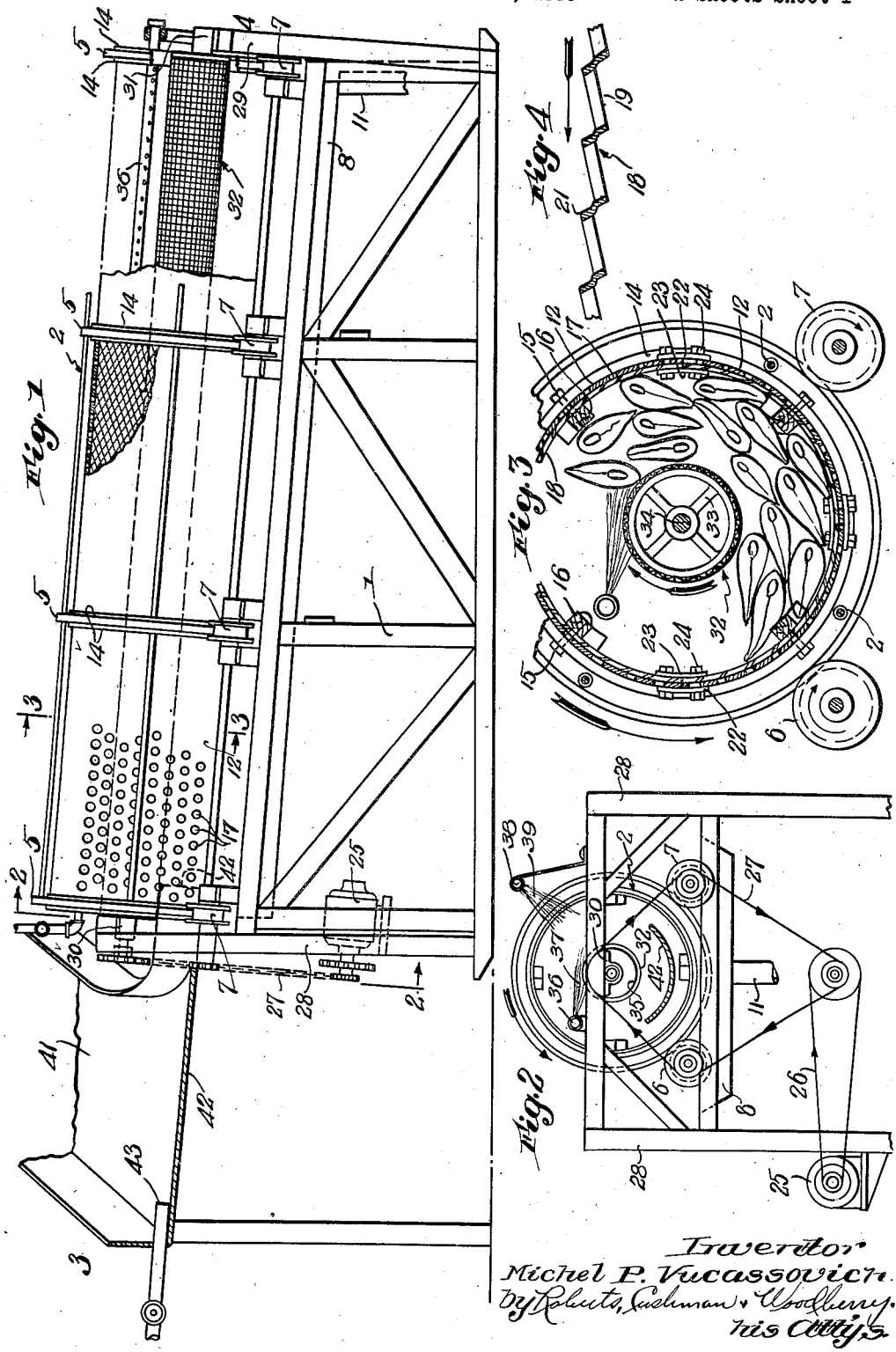
Inventor
Michel P. Vucassovich
by Roberts, Cushman & Woodbury
his Attys Aug. 8, 1944.  M. P. VUCASSOVICH  2,355,405
METHOD AND APPARATUS FOR REMOVING SCALES FROM FISH
Filed Nov. 21, 1939  2 Sheets-Sheet 2
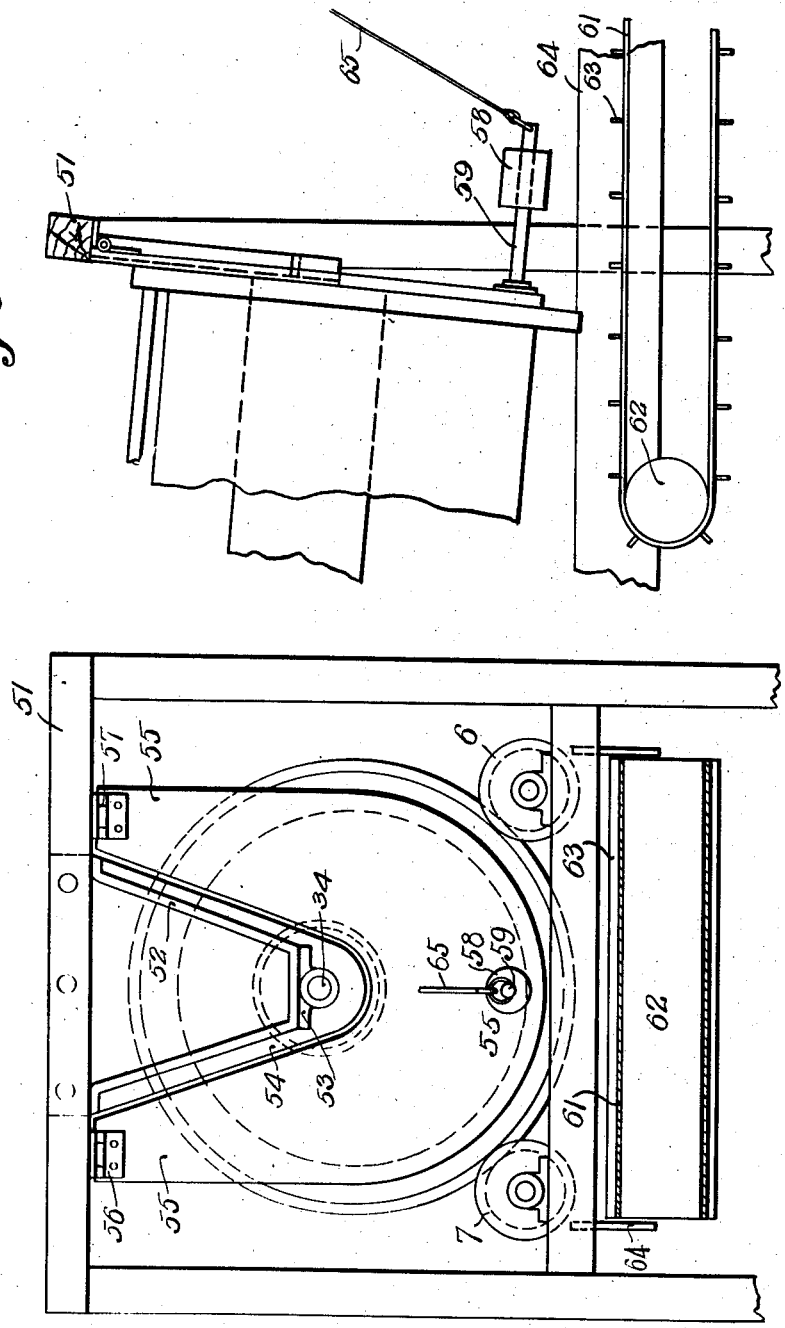

Patented Aug. 8, 1944

2,355,405

UNITED STATES PATENT OFFICE 2,355,405

METHOD AND APPARATUS FOR REMOVING SCALES FROM FISH

Michel P. Vucassovich, Beverly, Mass., assignor by mesne assignments, to Gloucester Research Corporation, New York, N. Y., a corporation of New York Application November 21, 1939, Serial No. 305,487

13 Claims. (Cl. 17—5)

The present invention relates to a method and apparatus for removing the scales from fish, and more especially from large fish or fish which are relatively soft and hence susceptible to damage by physical handling.

In my copending application, Serial No. 291,719, filed August 24, 1939, now Patent No. 2,331,855, dated October 12, 1943, I have described a method and apparatus in which an inclined rotary cylindrical chamber or screen is used, which is adapted to receive fish at the upper end, and, upon rotating the cylinder and passing the fish longitudinally therethrough, to remove the scales from the fish without breaking or even roughening the skin of the fish beneath the scales. In said method and apparatus, however, if large heavy fish are put through, a certain measure of difficulty may be encountered. For example, if the diameter of the chamber is too small the large fish may simply roll over and over as the cylinder is rotated, while if the cylinder is of large diameter, the fish may be carried up, by the rotation of the cylinder, to such height that when it falls, the impact may be sufficient to soften the skin or tissues of the fish, which is not desirable. Likewise soft fish, even though small, may be damaged by such impacts.

It is accordingly an object of this invention to provide a method and apparatus for the removal of scales from fish, and more especially for the treatment of large and heavy fish which can not well withstand the impact of their own bulk and weight. It is also an object to provide a method and apparatus for removing the scales from fish which may be naturally soft or thin-skinned and hence (even though not large nor heavy), not so resistant to mechanical handling as the usual run of fish which are caught and scaled for commercial purposes. Other objects will appear from the following disclosure.

In the present invention the fish to be scaled are contacted with an upwardly moving surface or screen and then brought into contact with a second surface or screen which may be moving in the same direction or an opposite direction, or which may be stationary, but which restrains the fish from falling and at the same time guides the fish back to their starting position, whence the operation may be repeated. One or the other of these screens or surfaces (or both of them) will be a scaling surface, that is, a surface capable of removing the scales from the fish and typically characterized by having short, sharp, but preferably obtuse, blades or edges, which are capable of cutting into and engaging the scales of the fish, to withdraw them from the fish, but incapable of cutting through them or of appreciably cutting into the skin of the fish after the scales have been removed therefrom. The scaling surface is preferably also characterized by having openings therethrough (adjacent to the sharp edges or blades) which are large enough to permit the scales to pass freely therethrough but insufficiently large to permit the fish to pass through or in fact any substantial part of the fish to pass through or become engaged in such openings.

In the method of the invention one of the surfaces or screens serves to receive the fish upon its upper surface and is disposed upwardly to carry the fish up to or at an angle at which the foremost fish or mass of fish reaches or exceeds its angle of repose and tends to fall or tumble backward over the fish following it. It is then contacted with the second surface, more or less parallel to the first, which restrains it—and controls or prevents it from such backward or free falling movement. Accordingly, and to serve this purpose, the second surface or screen may be suitably spaced from the first to receive the fish, and may be held stationary in this position and so disposed as to permit the uppermost fish to fall and slide over the succeeding fish, but restraining such fall and guiding the fish back to the bottom of the first surface or starting position whence it may again come into contact with the first surface and thus repeat the operation. If the second surface is a scaling surface this sliding movement of the fish against it will make it active upon them to remove the scales. On the other hand, the second surface may move in the same direction and at about the same speed or more slowly than the first surface. In this event, the second surface will act similarly with respect to guiding the fish downwardly, but will be somewhat more active upon them to remove the scales so long as they continue to slide downwardly and hence in the opposite direction to such upwardly moving second surface. If the second surface moves faster than the first surface, or faster than the falling fish, it will have a still greater action upon the fish so long as the fish continue to fall and hence travel in opposition thereto. But if the upward movement and disposition of the second screen are such as to carry the fish with it, then of course relative movement between the fish and the second surface is nullified and the fish, instead of falling backward, are simply carried by the second surface, and upon it if it is deflected into a horizontal or gradually upward direction. In such case, the fish will not fall but must be returned to the point of beginning by a different course from that of falling or sliding down over the fish following it.

On the other hand, if the second surface moves in a direction opposite to the movement of the first surface it will contact with the fish as they tend to fall or tumble backward from the topmost position—and thus prevent them from falling freely and guide them back to the starting point, again to be carried up by the first surface. If the second surface travels more slowly than the first surface it may move more slowly than the fish tend to fall, or it may travel downwardly at about the speed of the falling of the fish and hence have little if any action upon them. If it moves more rapidly it will of course be more active upon the fish. Accordingly, such action upon and movement of the fish may be controlled by the direction and speed of movement of the second surface, relative to the natural tendency of the fish to fall or the speed of the first surface, size and weight of fish, rate of delivery and throughput, etc.

If, in addition to the opposed relationships of the two surfaces, and the relative movements of the same and of the fish therebetween, both surfaces are also inclined longitudinally, the fish may be introduced between the surfaces at one end and, while raised by the first or lower surface and controllably lowered by the second or upper surface, as above described, they may be advanced longitudinally between the surfaces by gravity. By having the surfaces of sufficient length in this direction and at a suitable inclination, the fish will travel longitudinally of the surface in such a length of time as will permit of completely removing the scales from all of the fish as they are thus continuously fed therethrough.

In this way large and heavy fish may be completely scaled without softening or breaking the skin, and likewise soft fish or those having a thin or weak skin generally may be safely and satisfactorily scaled in a single pass.

A typical instance of carrying out the invention in actual practice will be described with reference to an apparatus comprising two concentric cylindrical surfaces or screens, the outer corresponding to the first surface or screen as above described and the inner corresponding to the second surface or screen, as illustrated by the accompanying drawings, in which:

Fig. 1 is a side elevation of the apparatus, with parts broken away to show details of arrangement and construction;

Fig. 2 is an end view of the entrance end of the scaler, in the plane of the line 2—2 of Fig. 1 in the direction of the arrows;

Fig. 3 is an enlarged cross-section of the cylinders in the plane 3—3 of Fig. 1 in the direction of the arrows;

Fig. 4 is an enlarged cross-sectional detail of expanded metal serving to provide the scaling surface or surfaces on the cylinders;

Fig. 5 is a view of the exit end of the scaler, in a modified form having a gate; and Fig. 6 is a side elevation of the gate and of the exit end of the scaler, as shown in Fig. 5, the rest of the scaler being broken away.

In the apparatus shown by the drawings, a supporting framework 1 is provided, upon which the cylinder 2 is mounted at a downward inclination from the entrance or feed end 3 to the exit or outlet end 4. As shown, the cylinder as a whole is composed of three sections which are alike and joined together and supported by four large circular bearing rings 5 carried upon two sets of trunnions 6, 7 mounted upon the framework 1, and above a longitudinal trough 8, mounted lengthwise beneath the cylinder throughout its entire length to collect water and washings therefrom, which pass off to the drain 11.

The sections of the outer cylinder of the scaler 12 are made up of two sheets of iron, each bent into semi-cylindrical form and bolted to flanges 14 on the bearing rings 5, by means of bolts 15 passing therethrough and through wooden beams or baffles 16, on the inside of the cylinder, which run longitudinally throughout the entire length of the scaler.

The cylindrical sections 12 are perforated with large openings 17 throughout their surfaces. On the inside of the cylinder and engaged therewith between the flanges 14 and baffles 16 by the bolts 15, are cylindrical sheets of perforate expanded metal 18, 18 (see Fig. 4) having openings 19 and sharp blades or edges 21 on the inner side and adjacent thereto, pointing inwardly and in fact defining such openings. The meeting edges of the iron sheets 12, 12 and of the expanded metal 18, 18 are held together by metal strips 22, 23, running longitudinally of the cylinder on the outside of the metal sheets 12, 12 and on the inside of the expanded metal sheets 18, 18 and bolted together therethrough by bolts 24. (See Fig. 3.)

As thus arranged the outer cylinder is adapted to be rotated by the bearing of its rings 5, 5 upon the trunnions 6, 7, as the latter are driven in unison by motor 25 through the chain drives 26, 27.

Mounted upon the uprights 28, 29 upon the framework 1, at the entrance and exit ends, 3 and 4, respectively, are provided suitable bearings 30, 31 for a smaller hollow cylinder 32 having a spider framework 33 on the shaft 34, and constituting the second surface, as above described. This may be made of simple screening, as shown, or may present a scaling surface, if made of expanded sheet metal like that used in the outer cylinder, which has just been referred to and is shown in Fig. 4, but in which the sharp blades, corresponding to the blades 21, would be directed outwardly and hence oppositely to the sharp edges 21 on the inner side of the large cylinder.

This inner cylinder 32 may be stationary as already indicated, but it may also be driven, as by suitable connection, through the sprocket 35, to the chain drive 27 (Fig. 2), in the present instance in a direction opposite to that of the outer cylinder (and more rapidly in R. P. M.) as in the arrangement shown in Fig. 2. But the chain drive 27 may obviously be rearranged to drive the cylinder in the same direction as the outer cylinder, if desired, and the relative speeds in both cases may be adjusted suitably to the type of fish to be scaled, the rate of throughput, the inclination and length of the cylinders, and like considerations, including the absolute speed of the cylinders in R. P. M. or feet per minute.

Longitudinally through the upper part of the outer cylinder is mounted a high pressure water pipe, 36, perforated throughout its length to provide vigorous jet sprays 37 directed horizontally across or downwardly upon the outer surface of the inner cylinder. Also, a high pressure water pipe 38 is mounted longitudinally of and above the outside of the outer cylinder, perforated throughout its length to provide vigorous jet sprays of water 39 directed downwardly upon the outer surface of the outer cylinder.

At the entrance end of the cylinder 3 is provided a chute 41, leading from a bin or like device adapted to furnish a large supply of fish to be scaled (not shown) and leading into the flume 42 (the nearer wall of which is broken away in the drawings) which is inclined downwardly to and slightly into the entrance end of the outer cylinder somewhat above its bottom as shown in Fig. 2. Longitudinally of the chute 42 is provided a jet of water 43.

In operation, the fish, which are more particularly large fish, such as cod, hake, haddock etc.—though smaller fish may be handled—are released from the supply into the chute 41 and thence into the flume 42 where the jet of water 43 arranges them longitudinally of the cylinder and charges them into the larger cylinder (between the larger outer cylinder 12 and the smaller inner cylinder 32) where the rotation of the cylinder, as indicated by the arrows, carries them upwardly as shown in Fig. 3. As they reach or exceed the angle of repose, which is one half to three fourths of the way up the side, they fall and slide inwardly over the fish following them and toward the inner cylinder 32. Here they are met by the water jets 39 and 37 which check them from a tendency to pass over the inner cylinder and into the opposite side of the cylinder. Accordingly as they strike the inner cylinder, and more especially when the inner cylinder is rotated in opposite direction to the outer cylinder, the fish are drawn backwardly and downwardly by that surface to a point between the lower portions of both cylinders, where they are again released from the inner cylinder and permitted to slide over the other fish and again into contact with the inner surface of the outer cylinder.

In this operation, the sharp blades or edges 21 on the inner surface of the larger, outer cylinder, cut into and positively engage the scales upon the fish, as they come into contact with them, and in transmitting their energy of rotation to the fish through this engagement, these blades pluck out the scales of the fish, without disrupting the skin or other portions of the fish. This is assured by such blades being very sharp, but with obtuse angles between the sides, and also by being short, so as to engage a single scale or a few scales only at a time. Moreover, after the scales have been removed these small obtuse-angle blades are not effective to penetrate the soft skin of the fish. Hence, after engaging and removing the scales they have no further action upon the skin or tissues, and the fish is left clean of scales and perfectly whole.

By inclining the cylinders longitudinally downward from the entrance end, 3, the fish tend slowly to pass by gravity longitudinally of the cylinder as the latter is rotated and to distribute themselves automatically in this direction and then to fall out from the exit end 4 where they may be collected in any convenient way such as baskets, trucks or the like, and removed.

It facilitates the removal of the scales to have the fish wet, both in the action of the blades of the scaling surface to pluck them out as just described and also in the action of one fish rubbing upon another. This latter action is especially effective after a few of the scales have been plucked from each fish, when the scales which are left on each fish adjacent to those which have been removed, are permitted to engage with each other, due to the spaces left by the removed scales. Such engaged scales, upon further relative movement between the fish, tend to dislodge each other and hence actively and still further promote the removal of the scales therefrom. In addition to these scaling actions upon the fish there is the further action of the under surface or cylindrical screen upon the fish, as they again come into contact with it. If the inner cylinder is provided with a scaling surface, as above mentioned, the scaling action is of course enhanced still further at this stage.

The rapidity and degree of the scaling action upon the fish may be controlled and regulated by adjusting the several factors just described through corresponding adjustments of the sizes of the inner and outer cylinders, their relative sizes and spaced relationships, the provision of the scaling surface on the outer cylinder (as shown) or upon the inner cylinder or upon both cylinders, the rate of rotation of the outer cylinder, the stationary, corresponding or opposite direction and speed of the inner cylinder, the force and direction of the water sprays, the length of the cylinder or cylinders, and the slope or angle of inclination of the cylinders from the inlet end to the outlet end, respectively.

The scales, as removed by the blades 21, tend to pass through the adjacent openings 19 in the expanded metal and also through the larger openings 17 in the outer sheet metal cylinders, and thence fall into the trough 8, and flow to drain 11. The sprays of water tend to free the scales from between the fish and also to carry scales and other refuse or waste products which may be associated with them through the openings 19 and 17 and likewise to the drain, thus freeing and cleansing the scaled fish before they leave the scaler.

In the operation of this type of fish scaling device, it is necessary as well as desirable to operate upon a sufficiently large and continuous supply of fish, whether large or small, so that the fish upon traveling up on the side of the larger cylinder and falling backwardly upon the other fish will come into contact with the second surface, which is provided upon the inner cylinder, whether this is a plain screen surface or a scaling surface. In this way, not only are the fish prevented from the mechanical effects of falling as above described, but the scaling action is more active upon them, and not only may a greatly increased throughput of fish be handled, but they will be more effectively prevented from becoming softened or torn and will be more completely liberated from scales, in a shorter time and with a shorter apparatus. However, as will appear from the above disclosure, these factors may be accurately controlled with regard to the kind, size and special characteristics of each specific lot of fish by regulating the rate of feed to the scaler, the relative directions of rotation of the inner and outer cylinders, the relative speeds of the two opposed surfaces, the angle of inclination from the inlet end to the outlet end, the length of the cylinders, the direction and force of the water jets and the rate at which the fish are withdrawn at the outlet end.

In order to effect control of the rate at which the fish leave the scaler, a gate may be provided as in the modified form of the apparatus shown in Figs. 5 and 6. In this, the apparatus is substantially the same as that of Fig. 1, but instead of mounting the inner cylinder 32 upon the crossbeam 29, it is suspended from a higher crossbeam 51 by means of a V-shaped yoke 52, attached thereto and carrying a bearing 53 in its lower end, to receive the end of the shaft 34. Moreover, in this form, the shaft 34 may be positioned, as shown, somewhat above the center of the outer cylinder 12, and thus have a greater clearance between it and the inner surface of the outer cylinder, for the passage of the fish while under treatment and as they move downwardly by gravity and out of the scaler.

A V-shaped piece of plain sheet metal 54 may be attached to the inner side of the V-shaped yoke 52 (as by spot welding) so as to close this portion of the end of the cylindrical screen and to keep the fish from getting into the bearing or its support. The open U-shaped gate 55 is also a sheet of plain metal, cut out so as to fit around the yoke 52 and the V-shaped piece of sheet metal 54, and is hinged at its upper ends 56, 57, to the cross-beam 51, so as to swing downwardly in front of and to close the exit end of the scaler, as shown. Since the cylindrical scaler is inclined longitudinally, the exit end of it will be inclined, while the hinged gate 55 will tend to hang vertically. Consequently, they would tend to hang apart. Accordingly, a counterweight 58 is provided, mounted upon a bracket or other extension 59, which is affixed to the gate, so that its weight will tend to swing and hold the gate snugly against the end of the scaler.

Beneath the exit end of this scaler, is provided an endless belt, 61, mounted upon driven rollers or the like 62, and preferably having cross-strips 63 on its upper surface, which serve to form compartments 64 between them to receive and retain the fish as they fall onto the belt, together with crushed ice which is sometimes supplied to them in case they are to be delivered from the belt to storage.

When fish are charged into the open end 3 of the scaler, which are of such sizes or characteristics in retaining their scales that they would tend to fall or pass through the scaler too rapidly, or before the scales were completely removed, the gate 55 will be adjusted to bear firmly against the outlet end 4, as by setting the counterweight 58 outwardly near the end of the bracket 59. When closed in this way, the fish will be restrained from leaving the scaler and accumulate. In this way they will be subjected to a more prolonged treatment in the scaler than if they were permitted to fall freely from the exit end. Then, when the scaling treatment of the fish has been prolonged sufficiently to effect complete removal of the scales from the fish, the gate 55 may be raised, and may be fixed in raised position, as by a cord 65, suitably tied back. The further progress and egress of the fish through and from the scaler may be retarded by the accumulation of fish then formed, and continue at such retarded rate even with the gate raised. Alternatively, however, if the fish discharge rapidly when the gate is opened, the scaler may clear itself almost at once. In this event, the gate will be closed as the next charge is introduced at the entrance end, and the operation repeated periodically.

It is to be understood, however, that with some fish and with the gate omitted or standing open, the fish will be de-scaled upon the normal action of the scaler as they pass directly therethrough by gravity, as described above.

It is to be pointed out that whereas the invention has been described with respect to what is considered to be its preferred and most convenient form of two hollow, inner and outer cylindrical surfaces, the generic concept of the invention is not to be construed as so limited. For example, the surfaces might be of a different configuration or moved through a path or paths other than cylindrical. Thus, the surfaces or screens might travel along opposed inclined planes, for suitable distances, at appropriate distances, relative rates, etc. Furthermore the screens or surfaces need not necessarily be disposed interiorly and exteriorly of each other, but stand opposite in respect of their exterior surfaces only, and still be operated to function upon a supply of fish introduced between them, corresponding to that above described, with obvious changes in the arrangement and manipulation accordingly.

I claim:

1. The method of removing the scales from fish in which the scales are firmly held, comprising the steps of delivering a plurality of the fish upon an inclined surface, moving said surface in the direction of said incline upwardly, directing the fish from said first surface against a second surface, spaced from and opposed to the first surface, whereby the fish are arrested from falling freely, at least one of said surfaces being characterized by being a scaling surface, effecting a cutting penetrating engagement of the scaling surface with the scales of the fish, and plucking out the scales, upon relative movement between the scaling surface and the fish, without penetration of the flesh of the fish.

2. The method of removing the scales from fish in which the scales are firmly held, comprising the steps of delivering a plurality of the fish upon an inclined surface, moving said surface in the direction of said incline upwardly to the angle of repose, directing the fish from said first surface against a second surface, spaced from the first surface, whereby the fish are arrested from falling freely, at least one of said surfaces being characterized by being a scaling surface, having short, sharp knife edges formed by obtusely converging sides, effecting engagement of said knife edges of the scaling surface with the scales of the fish, and plucking out the scales, upon relative movement between the scaling surface and the fish, without penetration of the flesh of the fish by the knife edges.

3. Apparatus for removing the scales from fish in which the scales are firmly held, comprising an inclined surface, means for moving said surface upwardly in the direction of said incline, a second surface spaced from and opposed to said first surface, to arrest fish falling from the first surface, one of said surfaces being characterized by being a scaling surface and having short, sharp knife edges formed by approximately perpendicularly converging sides, whereby they engage, without penetrating through or between, the scales of the fish.

4. Apparatus for removing the scales from fish in which the scales are firmly held, comprising a hollow cylinder, means for rotating the same, a second cylinder mounted interiorly of and parallel to the first, one of the opposed surfaces of said cylinders being characterized by being a scaling surface and presenting short, sharp knife edges, formed by approximately perpendicularly converging sides, whereby the knife edges are adapted to engage, without penetrating through or between, the scales of fish upon being brought into contact therewith.

5. Apparatus for removing the scales from fish in which the scales are firmly held, comprising a hollow cylinder, means for rotating the same, a second cylinder mounted interiorly of and parallel to the first, and means for rotating the former cylinder, one of the opposed surfaces of said cylinders being characterized by being a scaling surface and presenting short, sharp knife edges, formed by obtusely converging sides, whereby the knife edges are adapted to engage, without penetrating through or between, the scales of fish upon being brought into contact therewith.

6. Apparatus for removing the scales from fish in which the scales are firmly held, comprising a hollow cylinder, means for rotating the same, a second cylinder mounted interiorly of and parallel to the first, one of the opposed surfaces of said cylinders being characterized by being a scaling surface and presenting short, sharp knife edges, formed by obtusely converging sides, whereby the knife edges are adapted to engage, without penetrating through or between, the scales of fish upon being brought into contact therewith, and means for controlling the egress of the fish from between said cylinders.

7. Method of removing the scales from fish, comprising the steps of mechanically impelling the fish, effecting a cutting penetrating engagement with the scales thereof and thereafter subjecting the fish to continued movement, whereby to pluck out and remove the scales from the fish, followed by arresting said movement of the fish, and gradually restraining the fish from falling freely by gravity.

8. Method of removing the scales from fish, comprising the steps of wetting fish, mechanically impelling the wetted fish, effecting a cutting penetrating engagement with the scales thereof, and thereafter subjecting the fish to further movement, whereby to pluck out and completely remove the scales from the fish, followed by arresting said movement of the fish, and restraining the fish from falling freely by gravity.

9. Method of removing the scales from fish, comprising the steps of mechanically impelling the fish in a stream of water, effecting a cutting penetrating engagement with the scales thereof, and thereafter subjecting the fish to continued movement, whereby to pluck out and completely remove the scales from the fish, followed by restraining the fish from falling freely by gravity.

10. Apparatus for removing the scales from fish, comprising mechanically movable means having substantially straight cutting edges adapted to have penetrating engagement with the scales of fish, said means subjecting the fish as a whole to movement across said cutting edges, whereby the cutting edges penetratingly engage and pluck out and remove the scales from the fish, and means gradually to restrain the fish from falling freely by gravity.

11. Apparatus for removing scales from fish, comprising a rotatable inclined cylinder to receive fish therein having substantially straight cutting edges constituting an interior scaling surface for cutting penetrating engagement with the scales of fish, rotation of the cylinder subjecting the fish as a whole to movement across the cutting edges and effecting cutting penetrating engagement of the cutting edges with the scales of the fish, thereby to pluck out and completely remove the scales, and a second rotatable inclined cylinder, mounted interiorly of and substantially parallel to the first, constituting a restraining surface to prevent the free fall of the fish from said scaling surface.

12. Apparatus for removing scales from fish, comprising mechanically movable means having substantially straight hard cutting edges of stainless steel, adapted to have penetrating engagement with the scales of fish, said means subjecting the fish as a whole to movement across said cutting edges, whereby the cutting edges penetratingly engage and pluck out and remove the scales from the fish, and mechanically movable means adapted to receive and restrain the fish from freely falling from said first means.

13. Apparatus for removing the scales from fish, comprising a rotatable inclined cylinder to receive fish therein, having substantially straight cutting edges constituting an interior scaling surface for cutting penetrating engagement with the scales of the fish, and openings between said cutting edges which are larger than the scales but smaller than the fish, rotation of the cylinder subjecting the fish as a whole to movement across the cutting edges and effecting cutting penetrating engagement of the cutting edges with the scales of the fish, thereby to pluck out and completely remove the scales, and a cylinder inside of and substantially parallel to the first, of like construction to that of the first cylinder and having an external scaling surface, adapted to receive and retard the downward movement of the fish from the first cylinder.

MICHEL P. VUCASSOVICH.